(12) United States Patent
Fox et al.

(10) Patent No.: US 6,360,857 B1
(45) Date of Patent: Mar. 26, 2002

(54) DAMPING ADJUSTER FOR SHOCK ABSORBER

(75) Inventors: Robert C. Fox, Los Gatos; John Marking, El Cajon, both of CA (US)

(73) Assignee: Fox Factory, Inc., Watsonville, CA (US)

(*) Notice: Subject to any disclaimer, the term of this patent is extended or adjusted under 35 U.S.C. 154(b) by 0 days.

(21) Appl. No.: 09/521,255

(22) Filed: Mar. 8, 2000

Related U.S. Application Data (60) Provisional application No. 60/125,336, filed on Mar. 19, 1999.

(51) Int. Cl.[7] .................................................. F16F 9/516
(52) U.S. Cl. ..................... 188/281; 188/285; 188/319.1
(58) Field of Search .............................. 188/281, 282.5, 188/282.6, 285, 317, 318, 319.1, 319.2

(56) References Cited

U.S. PATENT DOCUMENTS

| | | | | |
|---|---|---|---|---|
| 3,848,710 A | * | 11/1974 | Thompson et al. | 188/280 |
| 4,036,335 A | * | 7/1977 | Thompson et al. | 188/319 |
| 4,220,228 A | * | 9/1980 | Kato | 188/319 |
| 4,305,486 A | * | 12/1981 | Cowan | 188/319 |
| 4,337,850 A | * | 7/1982 | Shimodura | 188/319 |
| 4,546,959 A | * | 10/1985 | Tanno | 267/64.15 |
| 4,724,937 A | * | 2/1988 | Fannin et al. | 188/319 |
| 4,756,393 A | * | 7/1988 | Collee et al. | 188/299 |
| 4,958,706 A | * | 9/1990 | Richardson et al. | 188/319 |
| 4,997,068 A | * | 3/1991 | Ashiba | 188/319 |
| 5,133,434 A | * | 7/1992 | Kikushima et al. | 188/319 |
| 5,431,259 A | * | 7/1995 | Mizutani et al. | 188/299 |
| 5,542,509 A | * | 8/1996 | Bell | 188/322.14 |
| 5,988,330 A | * | 11/1999 | Morris | 188/322.15 |

FOREIGN PATENT DOCUMENTS

| | | |
|---|---|---|
| DE | 2445377 A1 * | 4/1975 |
| DE | 2945015 A1 * | 10/1981 |

OTHER PUBLICATIONS

Diagram of Shocks, downloaded on Aug. 1, 2000, from the web page of Cane Creek: http://www.canecreek.com/prod/shock/index_main.html.
Diagram of Compression tuning, downloaded on Aug. 1, 2000, from the web page of Cane Creek: http://www-.canecreek.com/prod/shock/index_main.html.
Diagram of Rebound tuning, downloaded on Aug. 1, 2000, from the web page of Cane Creek: http://www.canecreek-.com/prod/shock/index_main.html.
Description of Prior Art Fox Twin Clicker Shock Absorber.

* cited by examiner

Primary Examiner—Douglas C. Butler
Assistant Examiner—Melody M. Burch
(74) Attorney, Agent, or Firm—James F. Hann; Haynes Beffel & Wolfeld LLP (57) ABSTRACT

A shock absorber comprises an adjustment component movable in two degrees of freedom. When the adjustment component is adjusted within one of its degrees of freedom of movement, a characteristic, such as the compression damping, is adjusted and when the adjustment component is adjusted within the other of its degrees of freedom of movement another characteristic, such as the rebound damping, is adjusted. The invention extends to a method of adjusting the operation of a shock absorber.

9 Claims, 11 Drawing Sheets

DAMPING ADJUSTER FOR SHOCK ABSORBER

CROSS-REFERENCE TO RELATED APPLICATIONS

This application claims priority from U.S. Provisional Patent Application No. 60/125,336, filed Mar. 19, 1999, the full disclosure of which is incorporated herein by reference.

BACKGROUND OF THE INVENTION

A shock absorber can comprise a cylinder and a piston received in the cylinder for reciprocation within the cylinder. The piston can typically divide the cylinder into two opposed chambers, one chamber being defined on one side of the piston within the cylinder and the other chamber being defined on an opposed side of the piston within the cylinder. A piston shaft is typically connected to the piston and extends from the piston to a position outside of the cylinder. An appropriate fluid, such as oil, or air, or the like, is normally contained in the chambers.

In use, the fluid passes between the chambers in response to reciprocation of the piston in the cylinder to effect damping.

Typical shock absorbers can provide two kinds of damping: compression damping ("CD"), and rebound damping ("RD"). One normally refers to damping force created during "inward" travel of the shaft (shortening of the shock) and the other normally refers to damping force created during "outward" travel of the shaft (lengthening of the shock). Generally, but not always—depending on, for example, a linkage connecting the shock absorber to, for example, a vehicle, or the like—RD applies during outward motion of the shaft relative to the cylinder and CD applies during inward motion of the shaft relative to the cylinder.

For typical shock absorbers, these RD and CD forces vary depending on the velocity of the piston as it displaces in opposed directions within the cylinder during reciprocation. Because the piston is normally directly connected to the shaft, RD and CD forces also depend on shaft velocity. The key RD and CD characteristics of a shock absorber can be represented on a graph plotting damping force against velocity. Since RD and CD forces are usually required to be quite different, CD forces can typically be only 10% to 50% of RD forces for the same piston velocity during piston strokes in opposed directions in the cylinder. Accordingly, two separate curves, or profiles, are often provided on such a graph for an associated shock absorber to represent RD and CD forces relative to piston velocity in the cylinder for the associated shock absorber.

The RD and CD force characteristics, or profiles, for a shock absorber can have a major effect on the quality of performance provided by a shock absorber for a given application. In a given application, the ideal force profiles depend on a variety of factors. For example, on a factory-produced full-suspension mountain bicycle, the ideal damping force requirements or profiles can vary depending on (among other things) factors such as rider weight, rider skill, the particular terrain conditions, and the like.

Since such factors are extraneous to the bicycle, it would be desirable to provide a shock absorber with easily-adjustable RD and/or CD characteristics or values to enable a user of the mountain bicycle to adjust the RD and CD characteristics of the shock absorber. Accordingly, it would be advantageous to provide shock absorbers that are externally adjustable by the user.

Some adjustable shock absorbers provide for RD force adjustment only. Others provide for CD force adjustment only. And some provide for both RD and CD force adjustment. Typical shock absorbers that provide for both RD and CD force adjustment usually provide for one of the adjustments at an end of the shaft. The adjustment (whether made by knob, screw, lever, etc.) is usually communicated with a working portion of the shock absorber (for example, the piston) by means of a component extending down a center of the piston shaft. A common design uses a small adjuster rod (typically ⅛" in diameter) which extends down the center of a tubular shaft (typically having a ⅝" outer diameter (OD) and a slightly greater than ⅛" inner diameter (ID)). Adjustment is commonly made in either of two ways: a) the adjuster rod is moved axially (up or down) to alter damping (usually RD, on some designs CD) or, b) the adjuster rod is rotated to alter damping. There are various designs to convert the axial motion or the rotary motion into increased or decreased damping.

Many double-adjustable shock absorber designs only provide for the adjustment of one of the CD or RD characteristics of the shock absorber at the piston shaft end. The adjustment of the other of the CD and RD is then provided at another location, sometimes at an external fluid reservoir operatively connected to the shock absorber, for example. One manufacturer, FOX FACTORY, INC., of San Jose, Calif., for example, has been making an adjustable shock absorber which provides for adjustment of RD and CD. Such a shock absorber has been sold as the Twin-Clicker for over 15 years. The Twin-Clicker shock absorber provides RD adjustment at the shaft end (via axial motion of a central adjuster rod) and CD adjustment at the external fluid reservoir (connected to the shock absorber via a high-pressure hose).

It has been found that providing such double adjustment of a shock absorber at locations relatively far removed from each other is rather inconvenient for a user. Accordingly, a double-adjustable shock absorber design which provides for adjustment of both RD and CD at the shaft end is much more convenient and is thus very desirable. One such shaft-end double-adjustable shock absorber design uses two separate adjuster rods, which extend down a piston shaft, offset pins, and the like. This design is complicated and difficult to produce. Another shaft-end double-adjustable shock absorber design uses two concentric adjuster rods (one inside the other). This design requires two adjuster rods and a sufficiently large inside diameter within the piston shaft to provide room for both rods. An example of the two concentric adjuster rod design can be found in a shock absorber currently sold by Cane Creek of Fletcher, N.C.

SUMMARY OF THE INVENTION

According to one aspect of the invention, there is provided a shock absorber, comprising first and second parts, the first part comprising a cylinder having an interior, the second part comprising a piston, having first and second sides, received in the cylinder for reciprocation, the piston dividing the interior of the cylinder into a first chamber on the first side of the piston and a second chamber on the second side of the piston. The shock absorber further comprises at least one passage extending between and fluidly coupling the first and second chambers, a fluid contained in the first and second chambers, the first and second chambers being in fluid flow communication with each other through the passage in response to reciprocation of the piston in the cylinder. The shock absorber yet further comprises an adjustment component which is mounted to a chosen one of the first and second parts for adjustment within first and second degrees of freedom of movement relative to the chosen one of the first and second parts, such that when the adjustment component is adjusted within the first degree of freedom of movement, a resistance to fluid flow through the at least one passage from the first chamber to the second chamber is varied, and when the adjustment component is adjusted within the second degree of freedom of movement, resistance to fluid flow through the at least one, passage from the second chamber to the first chamber is varied.

According to another aspect of the invention, a method of adjusting the operation of a shock absorber is provided, the shock absorber comprising first and second parts, the first part comprising a cylinder having an interior and the second part comprising a piston reciprocally received in the cylinder, the piston dividing the interior of the cylinder into first and second chambers, and at least one passage fluidly coupling the first and second chambers on opposite sides of the piston. The method comprises adjusting selectively the position of an adjustment component, mounted to one of the first and the second parts, within a first degree of freedom of movement relative to the one of the first and second parts of the shock absorber to thereby adjust resistance to fluid flow through the at least one passage from the first chamber to the second chamber, and adjusting selectively the position of the adjustment component within a second degree of freedom of movement relative to the one of the first and second parts of the shock absorber to thereby adjust resistance to fluid flow through the at least one passage from the second chamber to the first chamber.

According to a further aspect of the invention, there is provided a shock absorber comprising a damping fluid cylinder, a damping piston slidably mounted within the cylinder and a shaft having an inner end connected to the damping piston for movement of the piston within the cylinder in first and second directions. The damping piston comprises a flow path therethrough and a variable restriction flow restrictor along the flow path. The shock absorber further comprises a damping adjuster having an axis extending along the shaft, a damping adjuster rotator operably coupled to the damping adjuster for rotating the damping adjuster about said axis and a damping adjuster driver operably coupled to the damping adjuster for longitudinally moving the damping adjuster along said axis. The damping adjuster is operably coupled to the flow restrictor so rotational and longitudinal movement of the damping adjuster separately operates the flow restrictor thereby separately changing the damping of the shock absorber during movement of the piston.

According to yet a further aspect of the invention, a shock absorber is provided, the shock absorber comprising a damping fluid cylinder, a vented piston slidably mounted within the cylinder and a hollow shaft having an inner end connected to the vented piston for movement of the piston within the cylinder in first and second directions. The vented piston comprises first and second flow paths which can open as the piston moves in the first and second directions, respectively, and first and second variable restriction flow restrictors along respective ones of the first and second flow paths. The shock absorber further comprises a damping adjuster rod, having a rod axis, extending through the hollow shaft, a rod rotator operably coupled to the rod for rotating the rod about the rod axis and a rod driver operably coupled to the rod for longitudinally moving the rod along the rod axis. The rod is operably coupled to the first and second flow restrictors so rotational and longitudinal movement of the rod operates the first and second flow restrictors, respectively, thereby separately changing the damping of the shock absorber as the piston moves in the first and second directions.

According to yet another aspect of the invention, there is provided a method of adjusting the operation of a shock absorber, the shock absorber comprising an adjustment component mounted for adjustment within at least two degrees of freedom of movement, the method comprising adjusting selectively the position of the adjustment component within one of the degrees of freedom of movement thereby to adjust resistance to fluid flow through a passage and adjusting selectively the position of the adjustment component within the other degree of freedom of movement thereby to adjust resistance to fluid flow through another passage.

According to yet a further aspect of the invention, there is provided a method of adjusting the operation of a shock absorber, the shock absorber comprising a cylinder, a piston received in the cylinder for reciprocation, a first chamber defined in the cylinder on one side of the piston, a second chamber defined in the cylinder on an opposed side of the piston, a fluid contained in the chambers, at least one passage extending between the chambers, through which passage fluid passes between the chambers in response to reciprocation of the piston in the cylinder, in use, the shock absorber further comprising an adjustment component mounted for adjustment within at least two degrees of freedom of movement, the method comprising adjusting selectively the position of the adjustment component within one of the degrees of freedom of movement thereby to adjust resistance to fluid flow through a passage and adjusting selectively the position of the adjustment component within the other degree of freedom of movement thereby to adjust resistance to fluid flow through another passage.

BRIEF DESCRIPTION OF THE DRAWINGS

The invention will now be described, by way of example, with reference to the accompanying diagramatic drawings, in which.

DESCRIPTION OF THE SPECIFIC EMBODIMENTS

The present invention is directed to a shock absorber which uses an adjustment component such as a damping adjuster rod, or shaft, having two degrees of freedom of movement, each of the degrees of freedom of movement being associated with adjustment of a particular damping characteristic of the shock absorber. In one embodiment, as shown in FIGS. 1–9, the two degrees of freedom of movement are associated with adjustment of the compression damping (CD) and the rebound damping (RD) of the shock absorber. The two degrees of freedom of movement can, instead, be associated with two other characteristics of the shock absorber, such as, for example, the adjustment of high-speed CD and low-speed CD of the shock absorber, where high-speed and low-speed refer to the velocity of a damping piston of the shock absorber in a cylinder of the shock absorber during a compression stroke, for example.

The two degrees of freedom of movement are preferably rotation, or angular displacement, of the damping adjuster rod about a longitudinal axis thereof and longitudinal movement, or translation, of the rod along its longitudinal axis. These adjustments are typically achieved by a user manipulating, respectively, a rod rotator and a rod driver operatively coupled to the rod. Typically, the rod rotator and the rod driver are separate components. However; they could be a single, combined component instead.

The rod is, in one embodiment, operatively coupled to first and second flow restrictors associated with first and second flow paths, which flow paths fluidly couple chambers in the cylinder on opposed sides of the piston and can open as the piston moves in first and second directions during reciprocation within the cylinder as the shock absorber performs compression and rebound strokes. Therefore, moving the rod, typically by rotating the rod and/or axially driving the rod in this embodiment, operates to change the flow-restriction of the first and second flow restrictors thereby separately changing the damping of the shock absorber as the piston moves in the first and second directions.

In one embodiment the rod is moved axially by the engagement of a proximal end of the rod with a rotary cam surface which is rotated by the user through a lever. The distal end of the rod, in this embodiment, abuts a restriction component, or compression stroke valve stack, thus adjusting the amount of force required to cause the valve stack to open.

The adjuster rod is, in this embodiment, preferably rotated through the use of a user-actuated dial, or thumb wheel, which is keyed to a proximal end portion of the adjuster rod. The proximal end portion of the rod and a hole in the thumb wheel, through which the proximal end portion of the rod extends, are, for example, hexagonal, so that rotation of the thumb wheel rotates the rod. The hole in the thumb-wheel and the proximal end portion of the rod are typically sized to permit the adjuster rod to freely move axially relative to the thumb wheel. The thumb wheel is preferably a detented thumb wheel so that it remains in a selected position once placed there by the user.

A distal end portion of the adjuster rod, in this embodiment, has a hexagonal cross-sectioned shape. A blocking component, or flow adjustment nut, having a hexagonal hole, is slidably mounted to the distal end portion of the adjuster rod. The flow adjustment nut is thus rotationally keyed to, but axially slidable along, the adjuster rod. The flow adjustment nut has external threads on an outer surface which engage with similar threads formed within a main bore, or internally screw-threaded passage, of the piston. Therefore, rotating the damping adjuster rod causes the flow adjustment nut to be rotated so as to move axially relative to the piston in the internally screw-threaded passage. This axial movement of the adjustment nut tends to cover and uncover a flow restriction port of a passage passing through the piston, thereby variably blocking the port, thus tending to change the damping during the corresponding movement of the piston in which fluid passes through the port. In this embodiment, the flow restrictor along a compression stroke flow path is the valve stack, while the flow restrictor along a rebound stroke path is formed by both the adjustment nut/flow restriction port and a rebound stroke pressure relief valve. Of course flow restrictors could be formed by other structures.

Figure 9:
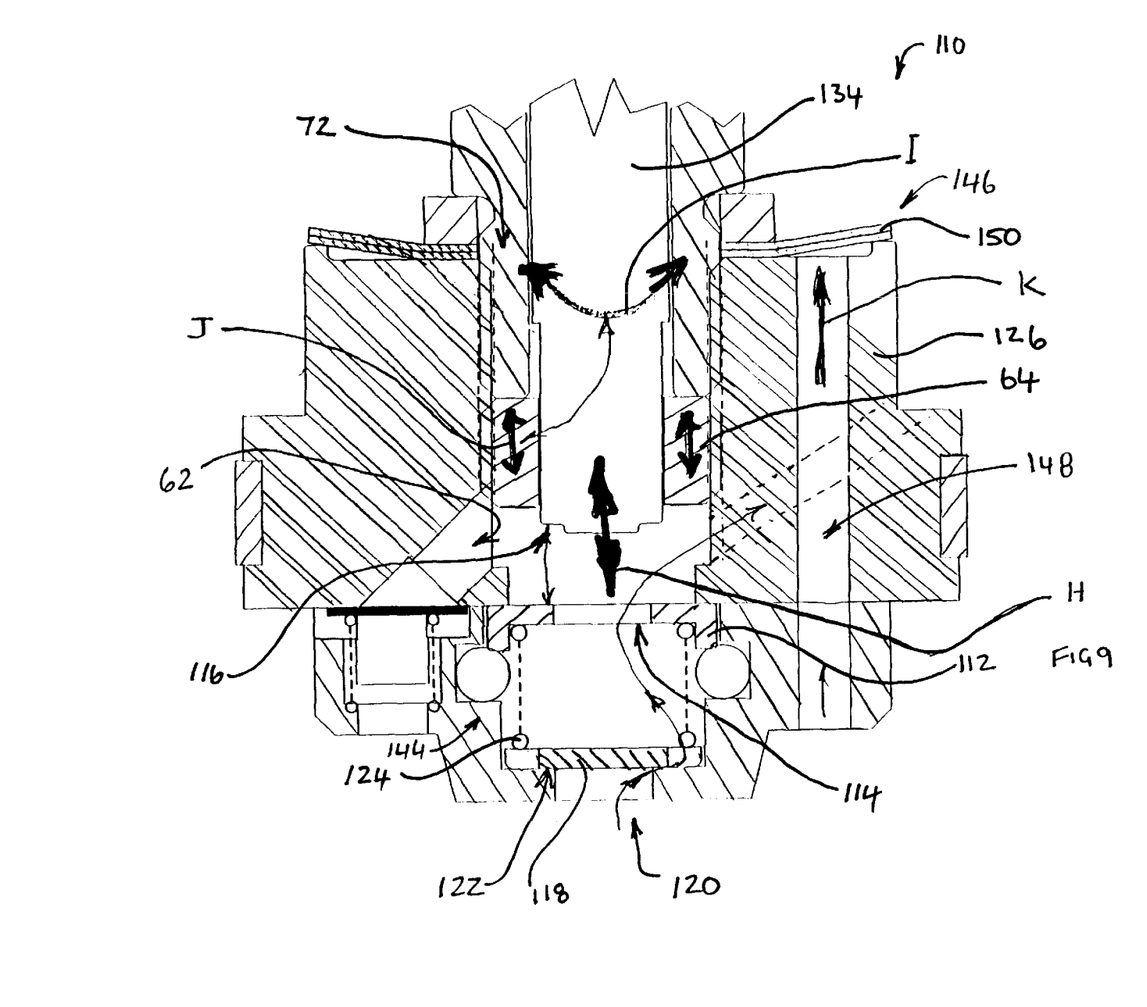
FIG. 9 shows a sectional side view of part of another shock absorber in accordance with the invention.
Figure 10:
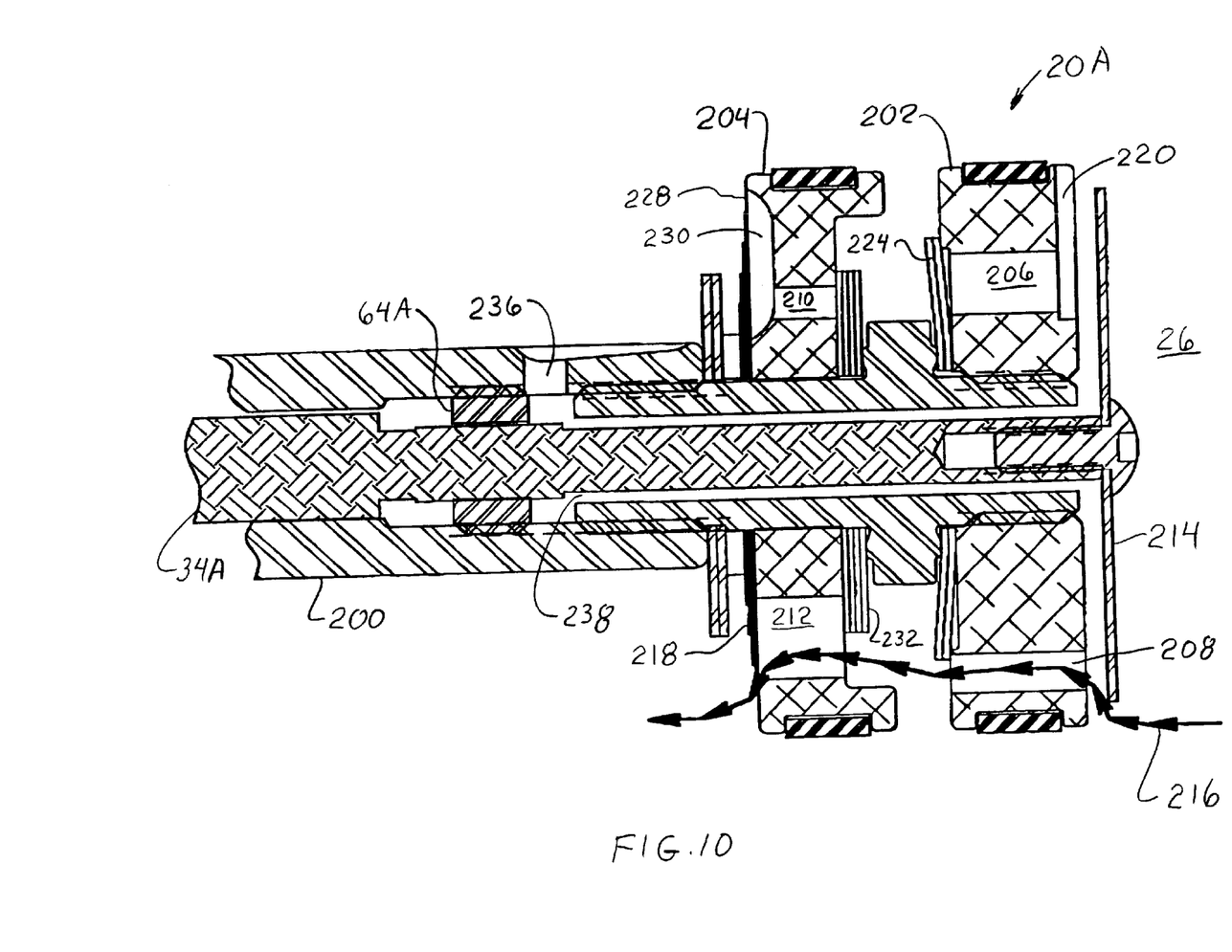
FIGS. 10–13 illustrate an alternative embodiment of the piston of FIGS. 1–8 illustrating the piston in various configurations to define a low resistance (easy) CD flow path in FIG. 10, a high resistance (hard) CD flow path in FIG. 11, a high resistance (hard) RD flow path in FIG. 12, a bleed flow path in FIG. 13.

An alternative embodiment provides for CD lockout, as shown in FIG. 9. Rather than adjusting compression damping by increasing or decreasing the pre-load on the compression valve stack, axial movement of the adjuster rod is used to seal off the compression flow. With this design increased compression pressure simply increases the force of contact between the distal end of the adjuster rod and an associated valve seat, further ensuring sealing off of compression flow. The blow off at very high compression pressures, such as when landing from a jump on a mountain bike, can be provided by, for example, a heavily preloaded valve stack at the top of the piston.

The embodiment of the invention shown in FIGS. 1–8 of the drawings, will now be described in greater detail.

Figure 1:
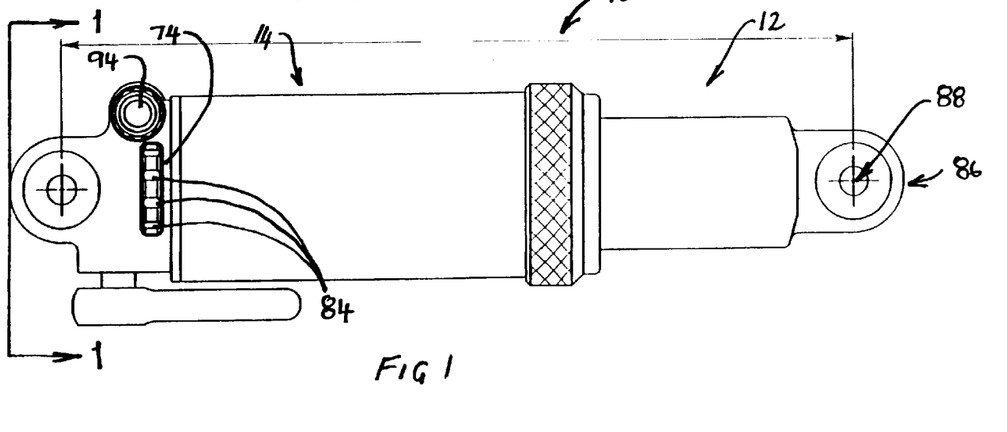
FIG. 1 shows a side view of a shock absorber in accordance with the invention, the shock absorber being in a partially compressed condition.
Figure 2:
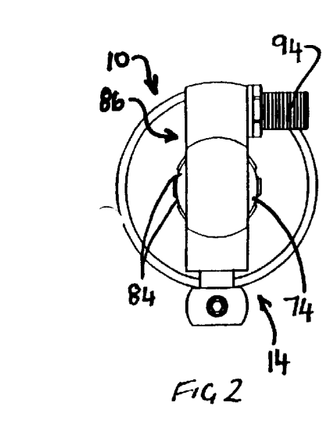
FIG. 2 shows an end view of the shock absorber along arrows 1—1 in FIG. 1
Figure 3:
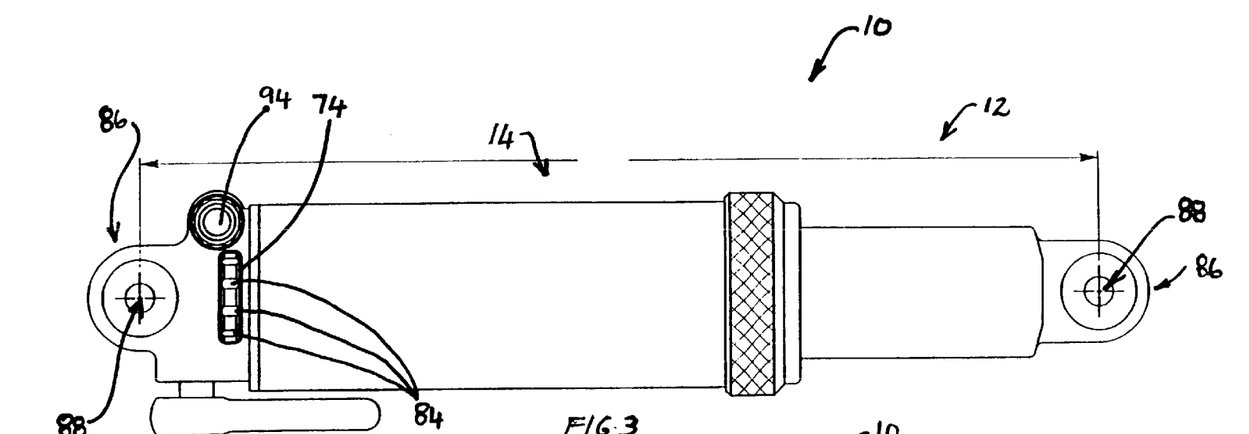
FIG. 3 shows a side view of the shock absorber shown in FIG. 1, but in an extended condition.

Referring initially to FIGS. 1–3 of the drawings, a shock absorber in accordance with the invention is generally indicated by reference numeral 10.

The shock absorber 10 comprises two parts, a first part 12 and a second part 14. The parts 12 and 14 are displaceable relative to each other during compression and rebound strokes of the shock absorber 10. FIG. 1 shows the shock absorber in a partially compressed condition and FIG. 3 shows the shock absorber in an extended condition.

Figure 4:
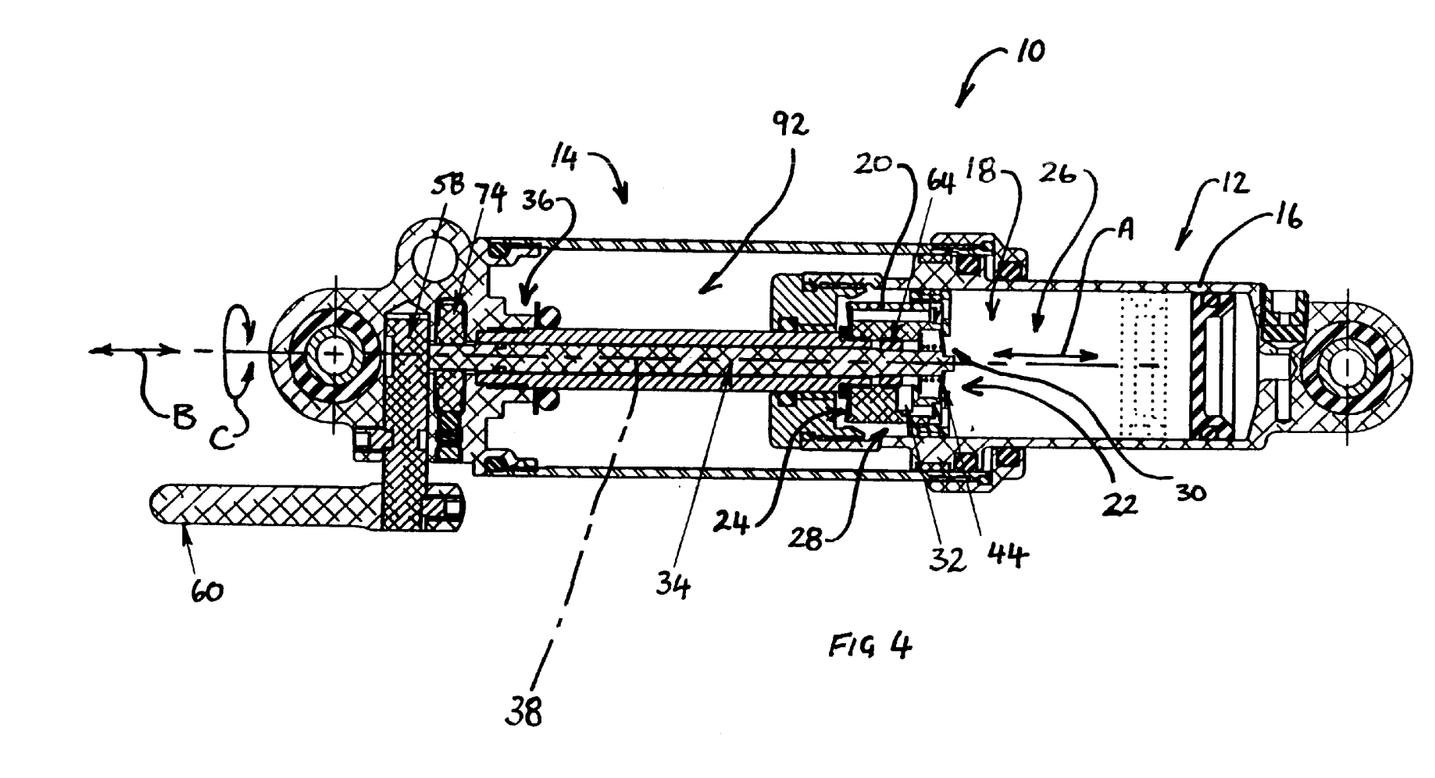
FIG. 4 shows a sectional side view of the shock absorber shown in FIG. 3.

Referring now to FIG. 4, the first part 12 comprises a cylinder 16 having an interior 18. The second part 14 comprises a piston 20 having a first side 22 and a second side 24. The piston 20 is received in the cylinder 16 for reciprocation within the cylinder as indicated by double-headed arrow A.

The piston 20 divides the interior 18 of the cylinder 16 into a first chamber 26 on the first side 22 of the piston 20 and a second chamber 28 on the second side 24 of the piston 20.

At least one passage, in this case two passages, 30 and 32, extend between and fluidly couple the first and second chambers 26, 28 respectively. The passages 30, 32 are conveniently defined by the piston 20. A suitable fluid, in this case oil, is contained in the first and second chambers 26, 28. The first and second chambers 26, 28 are in fluid flow communication with each other through the passages 30, 32 in response to reciprocation of the piston 20 in the cylinder 16, in use.

An adjustment component, conveniently in the form of an elongate shaft 34, which is mounted to a chosen one of the first and second parts 12, 14 for adjustment within first and second degrees of freedom of movement relative to the chosen part 12, 14 is provided. Conveniently, the shaft 34 is mounted to the second part 14 at 36, for adjustment within the first and second degrees of freedom of movement relative to the second part 14. The shaft 34 is mounted for adjustment within the first and second degrees of freedom of movement relative to the piston 20 of the second part 14. When the shaft 34 is adjusted within the first degree of freedom of movement relative to the piston 20, a resistance to fluid flow through the passage 30 from the first chamber 26 to the second chamber 28 is varied. When the shaft 34 is adjusted within the second degree of freedom of movement relative to the piston 20, resistance to fluid flow through the passage 32 from the second chamber 28 to the first chamber 26 is varied.

The shaft 34 defines a longitudinal axis 38. The shaft 34 is mounted on the second part 14 for axial displacement along its longitudinal axis 38 relative to the piston 20, as indicated by double-headed arrow B, the first degree of freedom of movement corresponding with axial displacement of the shaft 34 along its longitudinal axis 38 relative to the piston 20. The shaft 34 is also mounted on the second part 14 for angular displacement about its longitudinal axis 38 relative to the piston 20, as indicated by double-headed arrow C, the second degree of freedom of movement corresponding with angular displacement of the shaft 34 about its longitudinal axis 38 relative to the piston 20.

Figure 7:
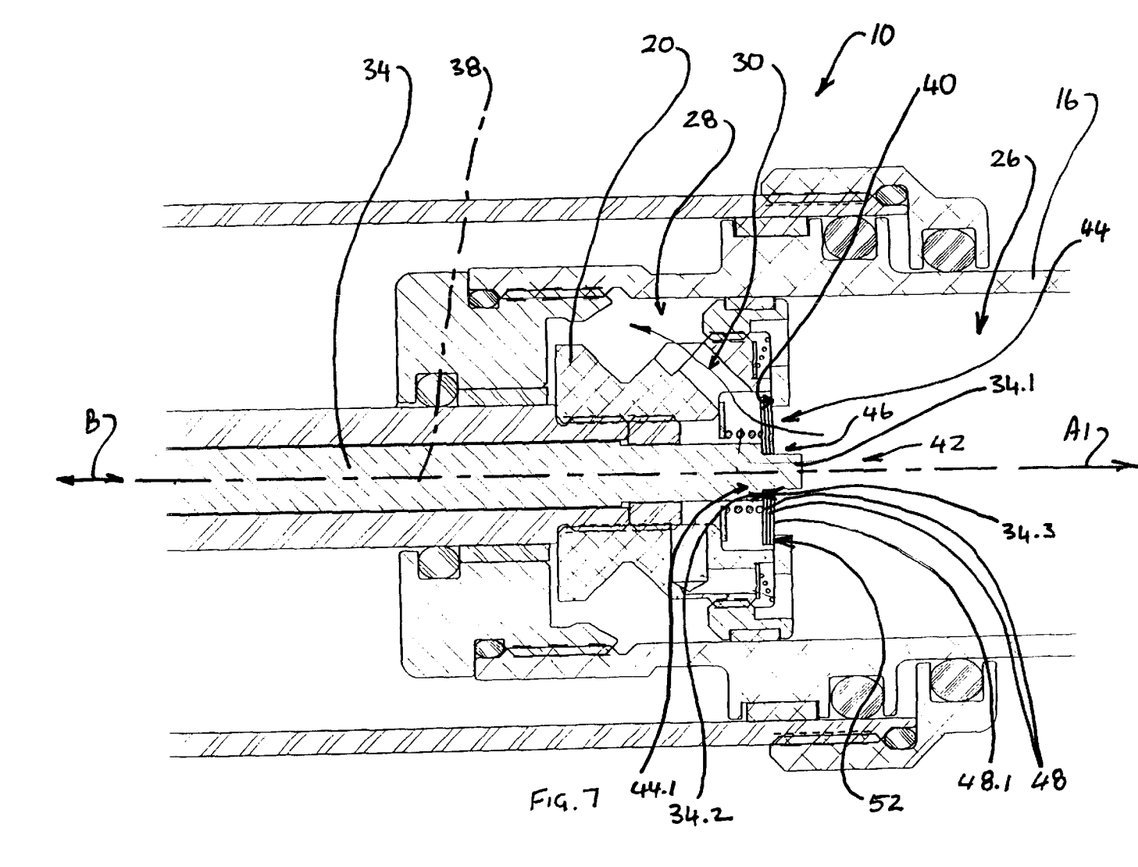
FIG. 7 shows, at a further enlarged scale, a sectional side view of part of the shock absorber shown in FIG. 5, and further shows a fluid flow path from a first chamber to a second chamber of the shock absorber during a compression stroke of the shock absorber.
Figure 8:
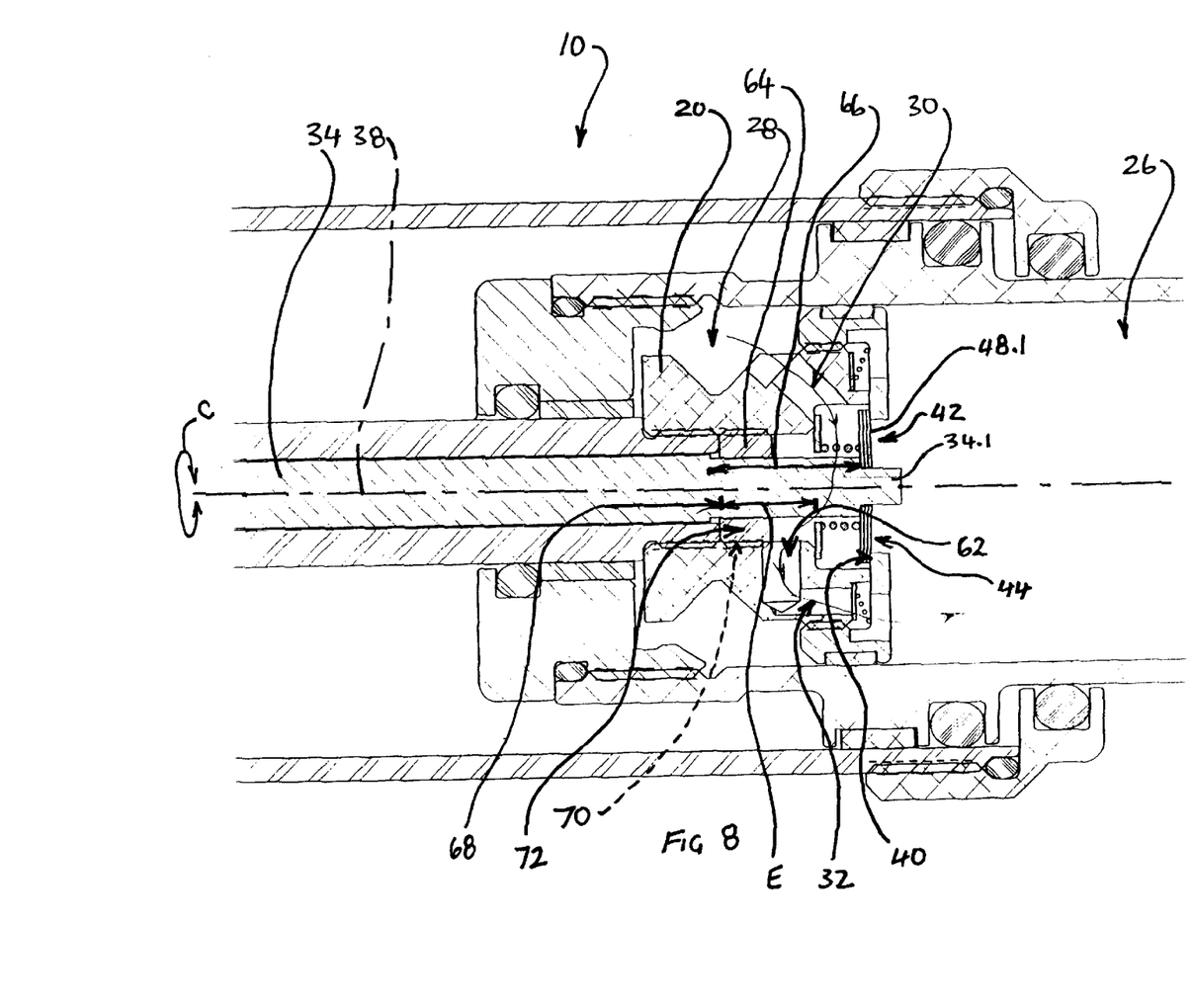
FIG. 8 shows a sectional side view of the shock absorber corresponding to FIG. 7, and further shows a fluid flow path from the second chamber to the first chamber of the shock absorber during a rebound stroke of the shock absorber.

Referring now to FIGS. 7 and 8 of the drawings, the piston 20 defines a peripheral seat formation 40 between which a port 42 of said one passage 30 is defined. The shock absorber 10 further comprises a restriction component, generally indicated by reference numeral 44, seated against the seat formation 40 to cover the port 42. The restriction component is arranged resiliently to yield in response to increased pressure in the first chamber 26, when the piston displaces in one direction A1 in the cylinder 16 as it reciprocates, so as to permit passage of fluid through the port 42 while the restriction component 44 resiliently resists the passage of fluid through the port 42. The restriction component is held against the seat formation 40 by the shaft 34, as indicated at 46.

The restriction component comprises at least one, typically a plurality of resilient washers 48. Although a single washer 48 can be used, a plurality of washers 48 is preferred. Three washers 48 are indicated. However, it will be appreciated that any appropriate number of washers can be used instead. As indicated, the three washers 48 are stacked one against another, one of the washers of the stack, indicated by reference numeral 48.1, being seated against the seat formation 40 to cover the port 42.

At 46, an end 34.1 of the shaft 34 abuts against one side 44.1 of the restriction component 44 thereby to urge the restriction component 44 against the seat formation 40. To this end, an annular recess 34.2 defining an annular step 34.3 is provided at the end 34.1 of the shaft 34, the restriction component 44 being carried on the recess 34.2 of the shaft 34 against the step 34.3. By means of the step 34.3, the shaft 34 urges the restriction component 44 against the peripheral seat 40.

The shaft 34 is arranged to vary a contact pressure of the restriction component 44 against the seat formation 40 at 52, in response to axial displacement of the shaft 34 along its longitudinal axis 38 relative to the piston 20, as indicated by double-headed arrow B, thereby to cause the restriction component 44 to vary resistance to fluid flow through the port 42 as the restriction component 44 yields in response to increased pressure in the first chamber 26 when the piston 20 displaces in the direction of arrow A1 in the cylinder 16.

Figure 5:
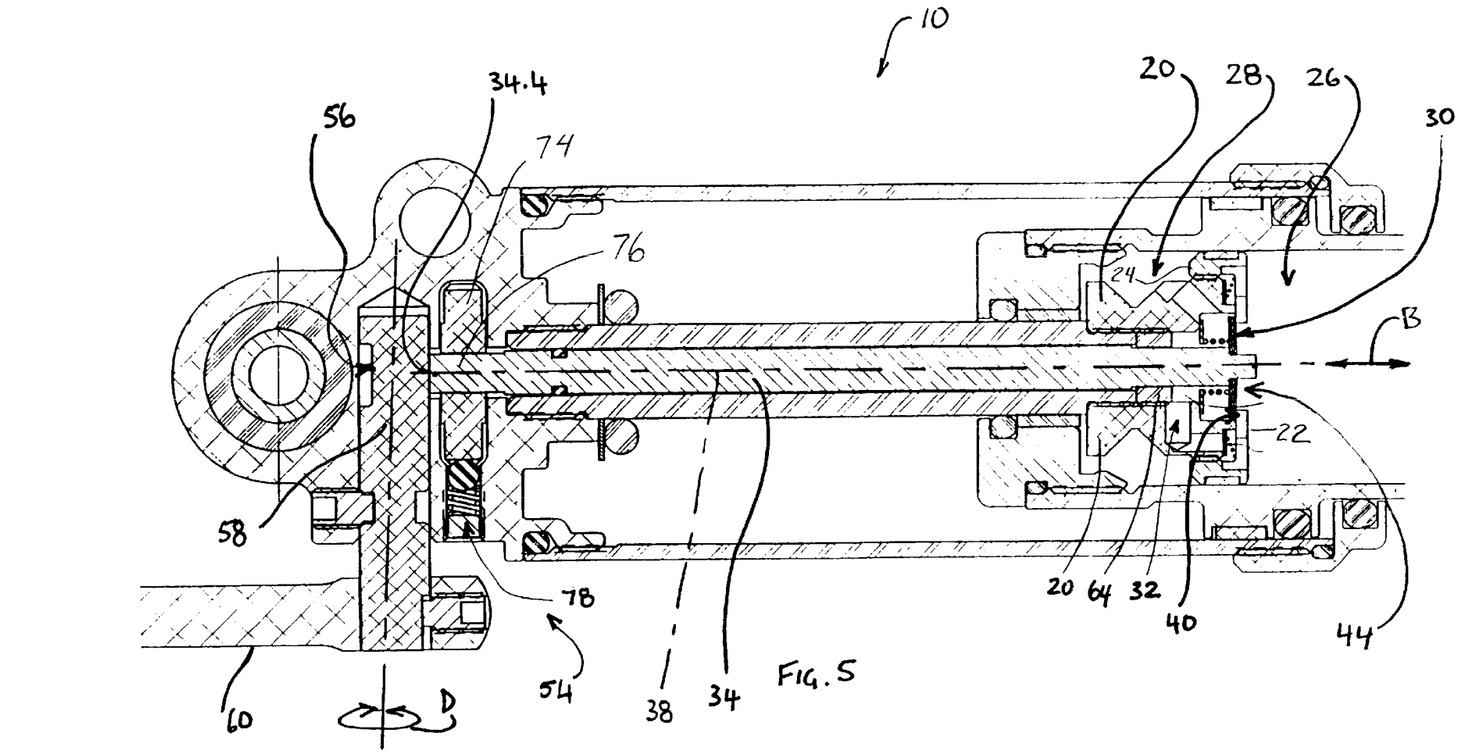
FIG. 5 shows, at an enlarged scale, a sectional side view of part of the shock absorber shown in FIG. 4, the shock absorber being in an extended condition.
Figure 6:
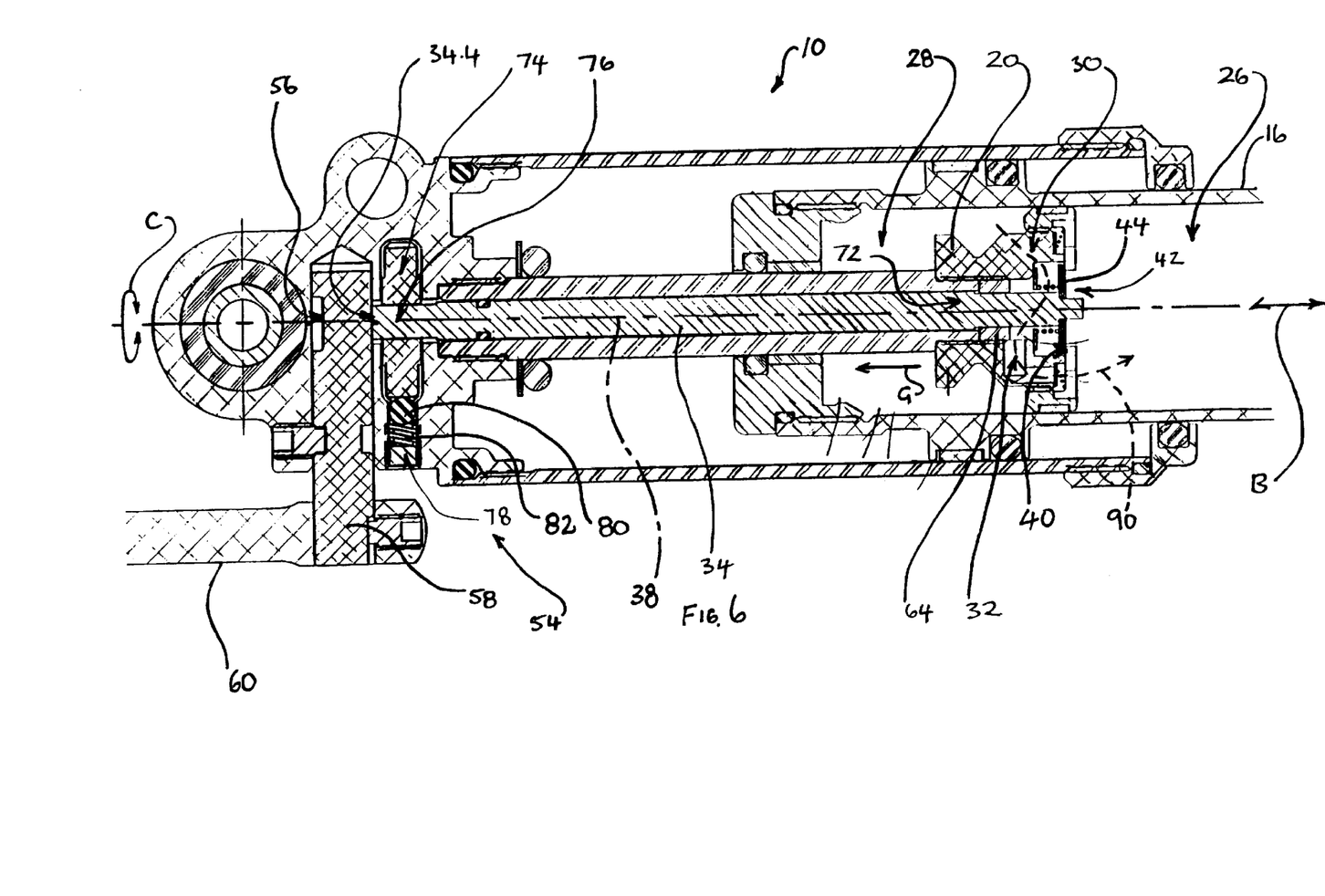
FIG. 6 corresponds to FIG. 5, the shock absorber being in a partially compressed condition.

As can best be seen with reference to FIGS. 5 and 6 of the drawings, the shock absorber 10 further comprises an actuator arrangement, generally indicated by reference numeral 54, operatively connected to the shaft 34 for axially displacing the shaft 34 along its longitudinal axis 38 relative to the piston 20 in response to actuation of the actuator arrangement 54. The actuator arrangement 54 comprises a cam 56 arranged to cooperate with the shaft 34 to cause the shaft to displace axially along its longitudinal axis 38 in response to angular displacement of the cam 56, relative to the shaft 34, as indicated by arrow D in FIG. 5. The actuator arrangement 54 comprises an actuation shaft 58 connected to the cam 56. Advantageously, the cam is formed on the actuation shaft 58. The cam 56 is angularly displaceable relative to the shaft 34 in the direction of arrows D in response to angular displacement of the actuation shaft 58. The cam 56 abuts against an end 34.4 of the shaft 34 so that the shaft is axially displaceable along its longitudinal axis 38 relative to the piston 20 in response to angular displacement of the cam 56 against the end 34.4 of the shaft 34. The actuator arrangement 54 further comprises a lever 60 connected to the actuation shaft 58 remote from the cam 56. The actuation shaft 58 is angularly displaceable by operation of the lever 60. It will be appreciated that the lever 60 is positioned outside the rest of the shock absorber 10 so as to enable a user selectively to adjust the axial position of the shaft 34 along its axis 38 by operation of the lever 60 outside the rest of the shock absorber 10.

Accordingly, shaft 34 acts as a damping adjuster, restriction component 44 acts as a variable restriction flow restrictor and actuator arrangement 54 acts as a damping adjuster driver.

Referring now to FIG. 8 of the drawings, the piston 20 defines a second port 62 of the other passage 32. The shock absorber 10 further comprises a blocking component 64. The blocking component 64 is arranged variably to block the second port 62, thereby to adjust resistance to fluid flow through the second port 62, in response to angular displacement of the shaft 34, about its longitudinal axis 38, relative to the piston 20, as indicated by double-headed arrow C. The blocking component 64 is typically in the form of an externally screw-threaded nut. The component 64 is mounted on the shaft 34 for axial displacement along the shaft 34 in response to angular displacement of the shaft 34, as indicated by double-headed arrow C, about its longitudinal axis 38 relative to the piston 20. Axial displacement of the component 64 relative to the piston 20 is indicated by double-headed arrow E.

The blocking component 64 and the shaft 34 have complementary engaging formations arranged to inhibit angular displacement of the blocking component 64 relative to the shaft 34 whilst permitting axial displacement of the blocking component 64 relative to the shaft 34. To this end, the shaft has a longitudinally extending multi-sided portion extending along its length as indicated at 66. The blocking component 64 defines a complementary multi-sided aperture 68 through which the multi-sided portion 66 of the shaft 34 extends. The complementary engaging formations are defined by sides on the multi-sided portion 66 of the shaft 34 and on the blocking component 64 adjacent the multi-sided aperture 68. Conveniently, the portion 66 is cross-sectionally hexagonally shaped, the aperture 68 being correspondingly hexagonally shaped so as to enable axial movement of the component 64 relative to the portion 66 whilst inhibiting angular displacement of the component 64 relative to the portion 66 of the shaft 34. The blocking component 64 has an external screw-thread at 70 and is screw-threadedly engaged in a complementary internally screw-threaded passage 72 defined by the piston 20. Accordingly, angular displacement of the shaft 34 in the directions of arrows C relative to the piston 20 causes the blocking component 64 to ride along the internally screw-threaded passage 72 as indicated by arrows E.

The port 62 opens into the screw-threaded passage 72 so that the port 62 is variably blocked by the blocking component 64 as the blocking component rides along the internally screw-threaded passage 72 in the directions of arrows E.

As can best be seen with reference to FIG. 6, the shock absorber 10 further comprises an actuator, generally indicated by reference numeral 74, operatively connected to the shaft 34 such that the shaft 34 can be angularly displaced in the directions of arrows C about its longitudinal axis 38 relative to the piston 20 in response to operation of the actuator 74. The actuator 74 is in the form of a dial, or thumb wheel, secured on the shaft 34 at 76. The dial 74 extends radially outwardly from the shaft 34 such that the shaft 34 can be angularly displaced about its longitudinal axis 38 relative to the piston 20 in response to angular displacement of the dial 74 relative to the piston 20.

As can best be seen with reference to FIGS. 1–3 of the drawings, the dial 74 extends to a position outside of the rest of the shock absorber 10 so as to enable a user to turn the dial 74 from outside the rest of the shock absorber. A detent 78, as can be seen in FIG. 6, is provided for releasably locking the dial 74 at a selected angular position relative to the piston 20. The detent 78 typically comprises a ball 80 which cooperates with a helical spring 82 to urge the ball 80 into complementary recesses on the dial 74. The complementary recesses are indicated at 84 in FIGS. 1–3.

Accordingly, piston 20, having passages 30, 32 formed therein, acts as a vented piston, shaft 34 acts as a damping adjuster rod, actuator 74 acts as a rod rotator and actuator arrangement 54 acts as a rod driver.

In use, the shock absorber 10 is typically mounted between two components, such as linkages, or the like, to effect damping between such components. To this end, opposed mounting formations 86, as can best be seen with FIGS. 1 and 3, are provided. The mounting formations 86 typically define holes 88 to enable the shock absorber to be mounted between the components by means of standard fasteners, such as nut and bolt assemblies, or the like. It will be appreciated that damping between the external components to which the shock absorber is connected, is effected by damping reciprocation of the piston 20 within the cylinder 16. This will now be described with reference to FIGS. 5 and 6 of the drawings. FIG. 5 shows the shock absorber in a fully extended position. During damping, the opposed mounting formations 86 are caused to displace toward each other. This causes the shock absorber to perform compression and rebound strokes in sympathy with such displacement of the mounting formations 86 toward and away from each other. When the shock absorber performs a compression stroke, such as when the piston 20 moves from a position indicated in FIG. 5 to an arbitrary second position as indicated in FIG. 6, fluid passes from the first chamber 26 to the second chamber 28 through the one passage 30. As the fluid passes through the passage 30, such passage is resisted by means of the restriction component 44. As mentioned, the component 44 is seated against the peripheral seat 40. Accordingly, to permit the passage of fluid through the passage 30, the component 44 yields to permit the fluid to pass between an outer annular region of the component 44 and the seat 40. It will be appreciated that the resistance to fluid flow through said passage 30 is determined by the resilience of the component 44 which resists displacement of its annular outer portion away from the seat 40. When the shaft 34 is displaced in an axial direction as indicated by arrows B, a degree of pre-load of the component 44 against the seat 40 is varied. In consequence, as a result of the variation of the pre-load of the component 44 in response to axial displacement of the shaft 34, the resistance to fluid flow through the passage 30 is varied, and, accordingly, the compression damping characteristic of the shock absorber 10 is also varied.

After performing such a compression stroke in which damping was effected, the opposed formations 86 are urged away from each other in response to the components to which the shock absorber 10 is connected moving away from each other. This movement causes the piston to be urged from the position shown in FIG. 6 back toward the position shown in FIG. 5. This is referred to as a rebound stroke of the shock absorber 10. When the piston 20 moves back toward the position shown in FIG. 5, and as indicated by arrow G in FIG. 6, fluid returns from the second chamber 28 to the first chamber 26 through the other passage 32. In doing so, the fluid follows a flow path as indicated by dashed arrow 90. It will be appreciated that during such a rebound stroke, the restriction component 44 is urged against the seat 40 thus acting as a one way valve to block passage of fluid from chamber 28 to chamber 26 through the port 42.

When passing along the path 90, the fluid passes through the port 62. Resistance to fluid flow through the port 62 is varied by variably blocking the port 62 as already described. It will be appreciated that the smaller the access through the port 62 becomes, the greater the resistance to fluid flow therethrough becomes. This can be effected by the user by angularly displacing the dial 74 thereby angularly to displace the shaft 34 as indicated by arrow C. When the shaft is rotated in this manner, the blocking component 64 is caused to ride along the internal passage 72 thereby variably to block the port 62 so as to change the rebound damping of the shock absorber 10.

Referring now to FIG. 9 of the drawings, part of another shock absorber in accordance with the invention will now be described. Like reference numerals used in FIGS. 1–8 are used in FIG. 9 to designate similar parts unless otherwise stated.

The shock absorber 110 in FIG. 9 is similar to the shock absorber 10, save that it has a restriction component, generally indicated by reference numeral 144 which is different to the restriction component 44 of the embodiment of the invention shown in FIGS. 1–8.

The restriction component 144 comprises an annular collar formation 112. The annular collar formation 112 defines an aperture 114. The shaft 134 comprises an annular recess 116 arranged to receive a peripheral portion of the collar 112 adjacent the aperture 114.

The component 144 further comprises a cover plate 118 which covers a port 120 which opens into a first chamber (not shown) of the shock absorber 110 in a cylinder (not shown) thereof. The blocking plate 118 is urged against a seat formation 122 by means of a helical spring 124, opposed ends of which abut against the cover 118 and collar 112 respectively.

In use, the shaft 134 is arranged for axial displacement relative to the piston 126 of the shock absorber 110, as indicated by arrow H. Furthermore, the shaft 134 is arranged for angular displacement relative to the piston 126 as indicated by arrow I. As before, angular displacement of the shaft 134 in the direction of arrows I causes a blocking component 64 to ride along an internally screw-threaded passage 72 defined by the piston 126. The blocking component 64 rides along the passage 72 as indicated by arrows J. As it travels in the direction of arrows J, a port 62 is variably blocked thereby to vary rebound damping of the shock absorber 110.

It will be seen that as the shaft 134 is axially displaced in the direction of the annular collar 112, the aperture 114 is gradually closed. The degree of closure of the aperture 114 by means of the shaft 134 varies the compression damping of the shock absorber 110. The shaft 134 can be axially displaced until the portion of the annular collar 112 adjacent the aperture 114 seats in the recess 116. In this manner, passage of fluid through the aperture 114 can be fully blocked. A high pressure relief valve 146 is provided to permit passage of fluid from the first chamber to a second chamber of the shock absorber 110 in the case of very high pressures in the first chamber. The high pressure valve 146 comprises a passage 148 normally closed by means of a resilient washer arrangement 150. It will be appreciated that the resistance to deformation of the washer 150 determines the pressure at which it would yield to permit fluid to pass through the passage 148 as indicated by arrows K.

It will be appreciated that when the shaft 134 is at least marginally clear of the annular collar 112 so as to permit fluid to pass through the aperture 114 during a compression stroke, resistance to fluid flow is also provided by means of the plate 118 resiliently urged against the aperture 120 by means of helical coil spring 124.

Furthermore, it will be appreciated that in the embodiment of the shock absorber described with reference to FIGS. 1–8, blocking off of the port 62 can be achieved if the shaft is axially displaced far enough so as to sufficiently pre-load the restriction component 44 to inhibit resilient deformation of the component 44 thereby to seal or block off the port 42.

Returning to FIGS. 1–8 of the drawings, the shock absorber can further be provided with a gas damping chamber as indicated by arrow 92 in FIG. 4 of the drawings. It will be appreciated that the gas chamber 92 can be pressurized. Accordingly, an air valve 94, as can best be seen with reference to FIGS. 1–3 of the drawings, can be provided whereby the pressure of the air, or gas, in the chamber 92 can be varied.

FIGS. 10–14 illustrate a further embodiment of piston 20 with its associated flow paths. Piston 20A is mounted to the distal end of a hollow piston shaft 200. Piston 20A includes first and second portions 202, 204, each portion defining various ports therethrough. In particular, portion 202 defines first and second ports 206, 208 while second portion 204 defines third and fourth ports 210, 212. A washer 214 is secured to the distal end of shaft 34A. Washer 214 can be moved to the position of FIG. 10 at which washer 214 is spaced apart from first portion 202 to provide fluid access from first chamber 26 into second port 208 as indicated by the arrows defining the low resistance (easy) CD flow path 216. In this position the resistance to fluid flow along flow path 216 is relatively low or small because the fluid primarily needs to overcome the moderate resistance provided by light check valve stack 218 which normally covers the end of fourth port 212 opening into second chamber 28.

Figure 11:
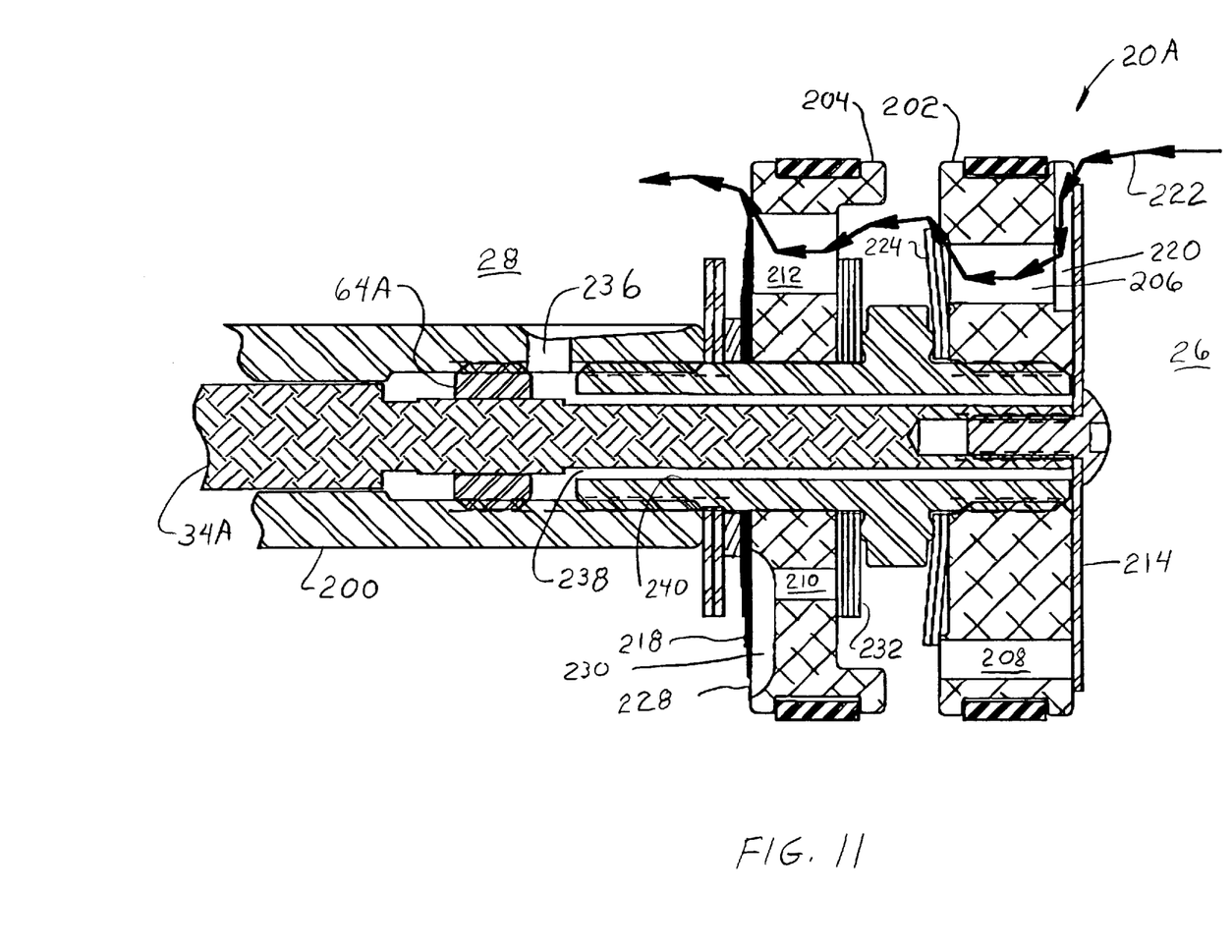

Turning now to FIG. 11, washer 214 has been pulled back against first portion 202 of piston 20A so to close port 208 thus halting flow along flow path 216. However, a slot 220 is formed in the surface of portion 202 and in fluid communication with first port 206 to permit fluid flow from first chamber 26 into first port 206 along a high resistance (hard) CD flow path 222. The resistance to fluid flow along path 222 is much greater than along path 208 because of the resistance created by a stiff check valve stack 224 which covers the end of first port 206 facing second portion 204. Thus, the resistance to fluid flow along flow path 222 must overcome not only the light resistance created by light check valve stack 218, which normally covers fourth port 212, but also the much greater resistance created by valve stack 224. It should be noted that second portion 204 has been rotated 180° in FIGS. 11, 12 and 13 relative to FIG. 10 for ease of illustration and clarity.

Figure 12:
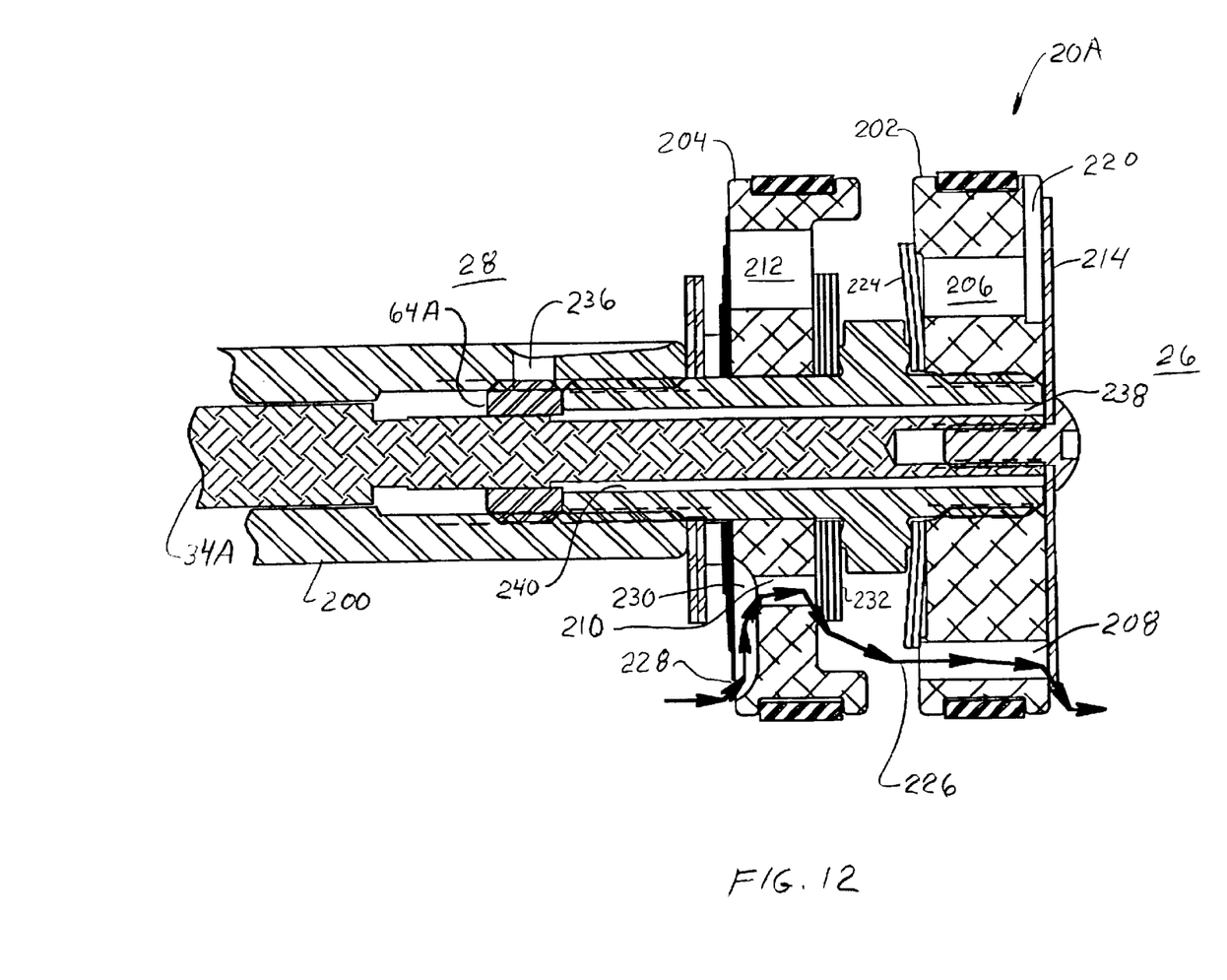

FIG. 12 illustrates piston 20A with a high resistance (hard) RD flow path 226 shown passing from second chamber 28 to first chamber 26 by first passing through a gap 228 between the outermost edge of light check valve stack 218 and a hollowed out region 230 in communication with third port 210 to permit fluid from chamber 28 access to port 210. The other end of port 210 is covered by a stiff check valve stack 232 which provides a reasonably high resistance to being deflected by fluid flowing along path 226. The fluid flow along flow path 226 must also deflect washer 214 as the fluid passes out of second port 208.

Figure 13:
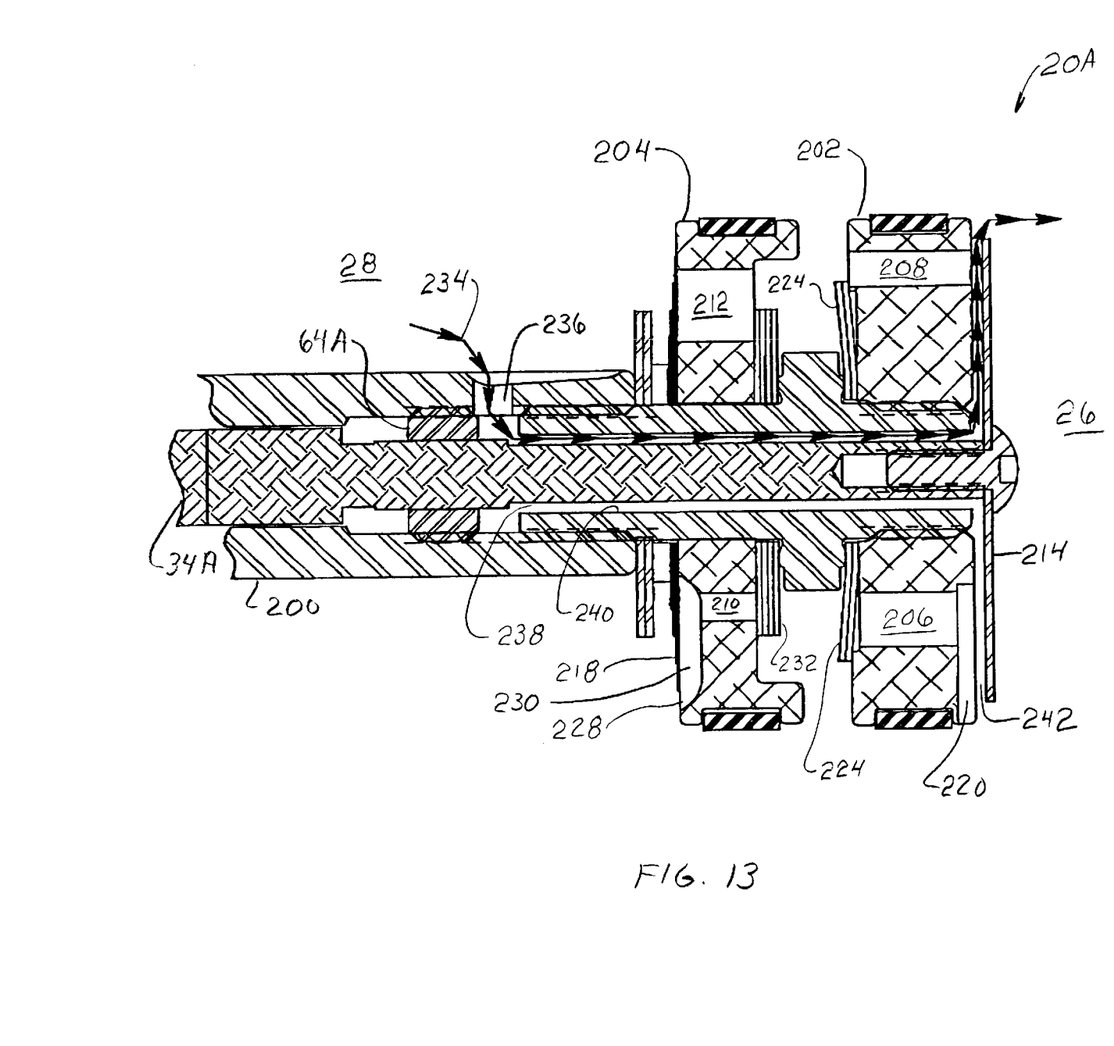

FIG. 13 illustrates piston 20A but shows fluid flow along a bleed flow path 234 which passes through a port 236 formed in hollow piston shaft 200 and then along a gap 238 defined between shaft 34A and an inner cylindrical wall 240 formed through piston 20A. Fluid pressure causes the axial movement of washer 214 thus creating a further gap 242 between piston portion 202 and washer 214 as indicated in FIG. 13. As in the earlier embodiments, blocking component 64A can be moved axially through the rotation of shaft 34A thus essentially completely opening port 236 as in FIG. 13 or blocking port 236 as in FIG. 12, or to a position between the two extremes of FIGS. 12 and 13 to permit the restriction to fluid flow along path 234 to be adjusted.

What is claimed is:

1. A shock absorber comprising:
 a damping fluid cylinder;
 a damping piston assembly comprising:
  a damping piston slidably mounted within the cylinder, the piston dividing the interior of the cylinder into a first chamber on the first side of the piston and a second chamber on the second side of the piston; and
  a shaft having an inner end connected to the damping piston for movement of the piston within the cylinder in first and second directions;
 the damping piston assembly comprising a flow path therethrough;
 the damping piston assembly comprising a variable restriction flow restrictor along the flow path;
 a damping adjuster having an axis extending along the shaft;
 a damping adjuster rotator operably coupled to the damping adjuster for rotating the damping adjuster about said axis and relative to the piston;
 a damping adjuster driver operably coupled to the damping adjuster for longitudinally moving the damping adjuster along said axis for axial displacement of the damping adjuster relative to the damping piston; and
 the damping adjuster operably coupled to the flow restrictor so rotational and longitudinal movement of the damping adjuster separately operates the flow restrictor thereby separately changing the damping of the shock absorber during movement of the piston;

the piston assembly defining a peripheral seat formation through which a port along said flow path is defined;

the flow restrictor comprising a restriction component seated against the seat formation to cover the port, the restriction component being arranged resiliently to yield in response to increased pressure in said first chamber, when the piston displaces in one direction in the cylinder as it reciprocates, so as to permit passage of fluid through the port while resiliently resisting said passage of fluid through the port;

the damping adjuster abutting against the restriction component thereby urging the restriction component against the seat formation with a force which varies according to the longitudinal position of the damping adjuster.

2. The shock absorber according to claim 1 wherein the restriction component comprises a plurality of resilient washers stacked one against the other.

3. The shock absorber according to claim 1 wherein the damping adjuster driver further comprises:

a cam arranged to cooperate with the damping adjuster to cause the damping adjuster to displace axially along said axis in response to angular displacement of the cam relative to the shaft;

an actuation shaft connected to the cam, such that the cam is angularly displaceable relative to the shaft in response to angular displacement of the actuation shaft, the cam abutting against an end of the damping adjuster so that the damping adjuster is axially displaceable along said axis in response to angular displacement of the cam against the end of the shaft; and a lever connected to the actuation shaft remote from the cam such that the actuation shaft can be angularly displaced by operation of the lever.

4. The shock absorber according to claim 1 wherein:

the damping piston assembly comprises a second flow path with a second port therealong; and the flow restrictor comprises a blocking component coupled to the damping adjuster for axial displacement parallel to the axis in response to angular displacement of the damping adjuster along the axis and relative to the piston, the blocking component arranged variably to block the second port, thereby to adjust resistance to fluid flow through the second port in response to angular displacement of the shaft about the axis.

5. A shock absorber comprising:

a damping fluid cylinder;

a damping piston assembly comprising:

a damping piston slidably mounted within the cylinder, the piston dividing the interior of the cylinder into a first chamber on the first side of the piston and a second chamber on the second side of the piston; and a shaft having an inner end connected to the damping piston for movement of the piston within the cylinder in first and second directions;

the damping piston assembly comprising a flow path therethrough;

the damping piston assembly comprising a variable restriction flow restrictor along the flow path;

a damping adjuster having an axis extending along the shaft;

a damping adjuster rotator operably coupled to the damping adjuster for rotating the damping adjuster about said axis and relative to the piston;

a damping adjuster driver operably coupled to the damping adjuster for longitudinally moving the damping adjuster along said axis for axial displacement of the damping adjuster relative to the damping piston;

the damping adjuster operably coupled to the flow restrictor so rotational and longitudinal movement of the damping adjuster separately operates the flow restrictor thereby separately changing the damping of the shock absorber during movement of the piston; and the damping adjuster driver comprising:

a cam arranged to cooperate with the damping adjuster to cause the damping adjuster to displace axially along said axis in response to angular displacement of the cam relative to the shaft;

an actuation shaft connected to the cam, such that the cam is angularly displaceable relative to the shaft in response to angular displacement of the actuation shaft, the cam abutting against an end of the damping adjuster so that the damping adjuster is axially displaceable along said axis in response to angular displacement of the cam against the end of the shaft; and a lever connected to the actuation shaft remote from the cam such that the actuation shaft can be angularly displaced by operation of the lever.

6. A shock absorber comprising:

a damping fluid cylinder;

a damping piston assembly comprising:

a damping piston slidably mounted within the cylinder, the piston dividing the interior of the cylinder into a first chamber on the first side of the piston and a second chamber on the second side of the piston; and a shaft having an inner end connected to the damping piston for movement of the piston within the cylinder in first and second directions;

the damping piston assembly comprising a flow path therethrough, said flow path having a port therealong;

the damping piston assembly comprising a variable restriction flow restrictor along the flow path;

a damping adjuster having an axis extending along the shaft;

a damping adjuster rotator operably coupled to the damping adjuster for rotating the damping adjuster about said axis and relative to the piston;

a damping adjuster driver operably coupled to the damping adjuster for longitudinally moving the damping adjuster along said axis for axial displacement of the damping adjuster relative to the damping piston;

the damping adjuster operably coupled to the flow restrictor so rotational and longitudinal movement of the damping adjuster separately operates the flow restrictor thereby separately changing the damping of the shock absorber during movement of the piston; and the flow restrictor comprising a blocking component coupled to the damping adjuster for axial displacement parallel to the axis in response to angular displacement of the damping adjuster along the axis, the blocking component arranged variably to block the port, thereby to adjust resistance to fluid flow through the port in response to angular displacement of the shaft about the axis.

7. A method of adjusting the operation of a shock absorber, the shock absorber comprising a cylinder, a piston assembly comprising a piston shaft connected to a piston, the piston received in the cylinder for reciprocation, a first chamber defined in the cylinder on one side of the piston, a second chamber defined in the cylinder on an opposed side of the piston, a fluid contained in the chambers, a flow path in the piston assembly extending between the chambers through which fluid passes between the chambers in response to reciprocation of the piston in the cylinder, the piston assembly defining a peripheral seat formation through which a port along said flow path is defined, a restriction component seated against the seat formation to cover the port, the restriction component being arranged resiliently to yield in response to increased pressure in said first chamber, when the piston displaces in one direction in the cylinder as it reciprocates, so as to permit passage of fluid through the port while resiliently resisting said passage of fluid through the port, the shock absorber further comprising an adjustment component, having a longitudinal axis, mounted for adjustment within at least two degrees of freedom of movement, the method comprising:

adjusting selectively the axial position of the adjustment component along its longitudinal axis and relative to the piston thereby adjusting resistance to fluid flow along the flow path in response to movement of the piston in the first direction thereby adjusting the axially directed force against the restriction component causing the restriction component to variably resist fluid flow through said port; and adjusting selectively the rotary position of the adjustment component about its longitudinal axis and relative to the piston thereby adjusting resistance to fluid flow along the flow path in response to movement of the piston in the second direction.

8. A method of adjusting the operation of a shock absorber, the shock absorber comprising a cylinder, a piston assembly comprising a piston shaft connected to a piston, the piston received in the cylinder for reciprocation, a first chamber defined in the cylinder on one side of the piston, a second chamber defined in the cylinder on an opposed side of the piston, a fluid contained in the chambers, a flow path in the piston assembly extending between the chambers through which fluid passes between the chambers in response to reciprocation of the piston in the cylinder, the shock absorber further comprising an adjustment component, having a longitudinal axis, mounted for adjustment within at least two degrees of freedom of movement, the method comprising:

adjusting selectively the axial position of the adjustment component along its longitudinal axis and relative to the piston, thereby adjusting resistance to fluid flow along the flow path in response to movement of the piston in the first direction, by angularly displacing a lever connected to an actuation shaft causing the actuation shaft to angularly displace a cam, said cam arranged to cooperate with the adjustment component about its longitudinal axis and relative to the piston to cause the adjustment component to displace axially along said axis relative to the piston shaft; and adjusting selectively the rotary position of the adjustment component thereby adjusting resistance to fluid flow along the flow path in response to movement of the piston in the second direction.

9. A method of adjusting the operation of a shock absorber, the shock absorber comprising a cylinder, a piston assembly comprising a piston shaft connected to a piston, the piston received in the cylinder for reciprocation, a first chamber defined in the cylinder on one side of the piston, a second chamber defined in the cylinder on an opposed side of the piston, a fluid contained in the chambers, a flow path in the piston assembly extending between the chambers through which fluid passes between the chambers in response to reciprocation of the piston in the cylinder, the flow path having a port situated therealong, the shock absorber further comprising an adjustment component, having a longitudinal axis, mounted for adjustment within at least two degrees of freedom of movement, the method comprising:

adjusting selectively the axial position of the adjustment component along its longitudinal axis and relative to the piston, thereby adjusting resistance to fluid flow along the flow path in response to movement of the piston in the first direction; and adjusting selectively the rotary position of the adjustment component about its longitudinal axis and relative to the piston thereby causing a blocking component, coupled to the adjustment component, to be displaced axially, the blocking component arranged to variably to block the port thereby adjusting resistance to fluid flow along the flow path in response to movement of the piston in the second direction.

* * * * *